US012767488B2

(12) United States Patent
Cruz et al.

(10) Patent No.: US 12,767,488 B2
(45) Date of Patent: Oct. 20, 2026

(54) CONTROL UNIT

(71) Applicant: Inventio AG, Hergiswil (CH)

(72) Inventors: Pablo Cruz, Saragossa (ES); Astrid Sonnenmoser, Hochdorf (CH); Adrian Steiner, Inwil (CH)

(73) Assignee: INVENTIO AG, Hergiswil (CH)

( * ) Notice: Subject to any disclaimer, the term of this patent is extended or adjusted under 35 U.S.C. 154(b) by 868 days.

(21) Appl. No.: 18/042,783

(22) PCT Filed: Sep. 3, 2021

(86) PCT No.: PCT/EP2021/074393
§ 371 (c)(1),
(2) Date: Feb. 24, 2023

(87) PCT Pub. No.: WO2022/049257
PCT Pub. Date: Mar. 10, 2022

(65) Prior Publication Data

US 2023/0356982 A1 Nov. 9, 2023

(30) Foreign Application Priority Data

Sep. 4, 2020 (EP) .................................... 20194527

(51) Int. Cl.
*B66B 19/06* (2006.01)
*B66B 5/12* (2006.01)
*B66B 19/00* (2006.01)

(52) U.S. Cl.
CPC .............. *B66B 19/06* (2013.01); *B66B 5/125* (2013.01); *B66B 19/002* (2013.01)

(58) Field of Classification Search
CPC ....... B66B 19/06; B66B 5/125; B66B 19/002; B66B 19/00; B66B 1/466; B66B 5/0025; B66B 5/185
See application file for complete search history.

(56) References Cited

U.S. PATENT DOCUMENTS 6,102,163 A * 8/2000 Liebetrau ............ B66B 11/0025 187/250
2005/0150728 A1* 7/2005 Van Der Meijden ........................ B66B 19/002 187/411

(Continued)

FOREIGN PATENT DOCUMENTS

CA 2220582 A1 * 5/1998 ......... B66B 11/0438
CN 1328525 A * 12/2001 ........... B66B 5/0087

(Continued)

*Primary Examiner* — Bickey Dhakal
(74) *Attorney, Agent, or Firm* — Shumaker, Loop & Kendrick, LLP

(57) ABSTRACT

A control unit is used to perform a method for installing an elevator system including the steps of: using an at least partially installed traveling body as a movable working platform borne by traction means and having an electronic safety brake; creating an operating state of the safety brake using the control unit to control the safety brake, the control unit having an input from a safety sensor, a processing unit and a signal output connected to the safety brake; generating a control signal by the processing unit at the signal output, wherein the control signal controls the safety brake; detecting an unsafe operating state by the safety sensor; controlling the signal output due to a detection of an unsafe operating state by the processing unit so that the safety brake is triggered; and removing the control unit when the installation of the elevator system is complete.

15 Claims, 3 Drawing Sheets

(56) References Cited

U.S. PATENT DOCUMENTS

| | | | | |
|---|---|---|---|---|
| 2012/0152663 | A1 | 6/2012 | Legeret et al. | |
| 2015/0225207 | A1 | 8/2015 | Minatta et al. | |
| 2019/0055107 | A1 | 2/2019 | Michel et al. | |
| 2020/0048041 | A1 * | 2/2020 | Fauconnet | B66B 1/3446 |
| 2020/0307952 | A1 * | 10/2020 | Wei | H04W 4/33 |

FOREIGN PATENT DOCUMENTS

| | | | |
|---|---|---|---|
| CN | 103303771 | A | 9/2013 |
| CN | 104718148 | A | 6/2015 |
| CN | 106744117 | A | 5/2017 |
| CN | 108025892 | A | 5/2018 |
| CN | 109626190 | A | 4/2019 |
| CN | 110526069 | A | 12/2019 |
| CN | 210366470 | U | 4/2020 |
| EP | 2998260 | A1 | 3/2016 |
| EP | 3456674 | A1 | 3/2019 |
| WO | 2010061265 | A1 | 6/2010 |
| WO | 2012080106 | A2 | 6/2012 |
| WO | 2012080106 | A3 | 6/2012 |

* cited by examiner

CONTROL UNIT

FIELD

The present invention relates to a method for installing an elevator system using a control unit for controlling an electronic safety brake.

BACKGROUND

When an elevator system is being installed, a common method is to construct the rail system from individual rail elements. Here, two lowermost rail elements are first mounted in the shaft pit. In order to fasten the rail elements to be mounted higher up in the shaft at the correct location, a movable working platform can be movably mounted on these first rail elements. This makes it possible to dispense with the use of construction scaffolding for installing the rail system. This working platform is moved through the shaft by means of a winch. After the rails have been installed, the working platform can be completely removed and replaced by the traveling body. It is advantageous to construct the working platform on a basic structure which is later used as part of the elevator car. This has the advantage of eliminating the effort for the complete disassembly of the working platform after the installation of the elevator. Only a part of the working platform needs to be disassembled. Another part of the elevator platform, i.e. the basic structure, is used further for the elevator car of the completed elevator system. Such a basic structure typically comprises a frame construction which is suitable for receiving final or temporary guide elements for guiding on the rail system and holding in a position suitable for moving the elevator platform. Furthermore, the basic structure may include a bottom plate of the elevator car or pulleys for the carrying means of the finished elevator system.

Such an installation method is disclosed in application WO 2010/061265.

The basic structure of the elevator car often already has safety brakes, in particular these are often electronically controlled electronic safety brakes. It is advantageous for the electronic safety brakes to already be attached to the basic structure in the factory since assembly at the factory can be carried out more easily than on the construction site. However, the electronic safety brakes cannot be used until the elevator system has been completed. For their control, the electronic safety brakes require control electronics. The control electronics are closely linked to the controller of the drive and sensor systems of the elevator system. During installation, i.e. in particular while creating the rail system, the controller of the drive and the sensor systems of the elevator system are neither installed nor ready for use.

The basic structure of the elevator car and the working platform erected thereon also serve, among other things, to transport persons. An object of the invention can therefore be considered to be securing the basic structure of the car against falling in the shaft.

SUMMARY

According to one aspect of the invention, a method of installing an elevator system achieves the object. The method comprises the steps of:

- using an at least partially installed traveling body as a movable working platform, wherein the at least partially installed traveling body is supported by a traction means, and the at least partially installed traveling body already has at least an electronic safety brake,
- creating an operating state of the electronic safety brake by using a control unit which is designed to control an electronic safety brake of an elevator system comprising a safety sensor, a processing unit, and a signal output,
  - connecting the signal output to the electronic safety brake,
  - generating a control signal by means of the processing unit at the signal output, wherein the control signal is able to control the electronic safety brake,
  - detecting an unsafe operating state by the safety sensor,
  - controlling the signal output due to a detection of an unsafe operating state by the processing unit so that the electronic safety brake can be triggered,
- removing the control unit when the installation of the elevator system is complete.

In other words, the control unit is designed to control a safety brake of an elevator system. The safety brake is referred to as an electronic safety brake because it is controlled by electronic signals or electrical currents. This means that the triggering process of the electronic safety brake is triggered by an electrical or electronic signal. The triggering causes braking. Optionally, the safety brake can also be tensioned or reset by electrical or electronic signals into a standby position.

The control unit serves for monitoring the safety of the traveling body, preferably the working platform, which is built on the basic structure for a limited time during the installation of the elevator system, and for being able to trigger the electronic safety brake on the traveling body. To connect the electronic safety brake to the control unit, the control unit has a signal output. The signal output has electrical contacts which are adapted to the electronic safety brake to be controlled. After completion of the installation of the elevator system, the control unit is removed. The electronic safety brake is then controlled, for example, by the elevator controller. This means that during the installation phase, the control unit controls the electronic safety brake since the elevator controller or another permanent controller of the electronic safety brake is not yet ready for use during the installation of the elevator. The control unit is therefore provided for temporary use during the installation of the elevator system, in particular during the installation of the rail system.

The safety sensor detects an unsafe operating state. At the very least, the falling of the vehicle is a manifestation of an unsafe operating condition that is detected.

The processing unit can take into account additional states such as, for example, the state of additional switches. Moreover, it can also delay the triggering of the electronic safety brake, for example, so that a brief response of the safety sensor, for example due to a stopping process during upward travel of the traveling body, does not lead to an activation of the electronic safety brake.

During construction, the elevator system comprises a partially installed rail system, a traveling body which serves to transport persons or material along the rail system, and an electronic safety brake of the traveling body. The elevator system comprises a control unit.

In other words, the elevator system has an incomplete rail system since the elevator system is just in the installation phase. In particular, the elevator system has not yet been completed. It serves to transport fitters working on the installation or completion of the elevator system, and the materials used in the installation or completion of the elevator system. The traveling body comprises components which remain in the elevator system after completion of the elevator system.

Preferably, the traveling body comprises a basic structure which is still used as part of a remaining car or a remaining counterweight after completion of the installation of the elevator system. This has the advantage that switching from the working platform to the traveling body of the finished elevator system, that is, basically after the installation of the rails, can occur much faster, more easily and more advantageously since the effort for complete disassembly of the working platform does not apply. Only a part of the working platform needs to be disassembled. The remaining parts of the working platform, i.e. the basic structure, are still used as part of the elevator car of the finished elevator system. Such a basic structure typically comprises a frame construction which is suitable for receiving final or temporary guide elements for guiding on the rail system and holding in a position suitable for moving the elevator platform. Furthermore, the basic structure can comprise a base plate of the elevator car or at least one floor support structure which is designed to receive a base plate of the elevator car. The basic structure can be designed as a catch frame with an upper and an optional lower yoke, and have two shields, which are preferably connected by at least one of the two yokes. In this case, a guide shoe, preferably four guide shoes, are attached to this catch frame. The electronic safety brakes are preferably attached to the lower yoke. In particular, the electronic safety brake is therefore fastened to the basic structure. The electronic safety brake is still used after completion of installation. During the installation of the elevator system, a working platform is built on the basic structure which makes it possible for a fitter to reach a location in the elevator system to be created and to perform work there such as, for example, the fastening of rail elements. The working platform preferably consists of panels, typically made of wood, which are placed on and fastened to the base plate of the elevator car or at least to a floor support structure which is designed to receive a base plate of the elevator car.

In the method, the traveling body is preferably partially assembled. Components of the traveling body such as a catch frame and a floor structure form a basic structure of the traveling body. This has the advantage that the basic structure of the traveling body can already be used as part of the working platform. The traveling body already has at least one electronic safety brake which is later still used in the completed elevator. In other words, the working platform is therefore constructed on components which are later also part of the traveling body of the completed elevator system. In particular, the partially assembled traveling body has an electronic safety brake. This electronic safety brake is used as an electronic safety brake both during the installation of the elevator system and after the completion of the installation in the elevator system.

Given the step of removing the control unit when the installation of the elevator system is complete, the control unit can be used for additional installations of other elevators. In the finished elevator system, the control of the electronic safety brakes is ensured by a control device of the elevator system.

Possible features and advantages of embodiments of the invention can be considered, inter alia and without limiting the invention, to be based upon the concepts and findings described below.

According to a preferred embodiment, the method additionally comprises the step of detecting an unsafe operating state on the part of the safety sensor which comprises a slack-cable contact which activates the electronic safety brake when a lower limit value for a tensile force on the traction means is undershot.

The slack-cable contact detects the loss of the tensile stress on a traction means. The loss of tensile stress on a traction means is an indicator that the traveling body is no longer being held by the traction means, and is therefore engaged in falling. In this case, the fall can be caused, for example, by breakage of the traction means, or by parting of the suspension of the traction means on the building or on the traveling body.

The slack-cable contact therefore monitors a tensile force, and the slack cable contact detects that the tensile force falls below a lower limit value for the tensile force. Such undershooting of the lower limit value can be an indication of the falling of the car and therefore an unsafe operating state.

The slack-cable contact is preferably connected to the processing unit by means of an electrical safety sensor cable. The processing unit processes the state of the slack-cable contact and, if necessary, triggers the electronic safety brake.

According to a preferred embodiment, the method additionally comprises the step of: supplying the control unit exclusively via a mobile energy source; in particular the mobile energy source is a battery.

The mobile energy source is preferably accommodated together with the processing unit in a common housing, or in a housing of the processing unit. Alternatively, the mobile energy source can also have its own housing. The mobile energy source is preferably designed such that it can store sufficient energy in order to operate the control unit for a work day or work shift. Preferably, the energy source is also interchangeable so that a discharged energy source can be replaced quickly with a charged energy source.

According to an alternative embodiment, the method additionally comprises the step of supplying energy to the control unit via a power connection. Such a connection, for example a socket with 240 V alternating current, is present on the working platform for example for operating the tools, such as a drill. In the event of a power failure at this power connection, the control unit in every case produces a safe operating state of the electronic safety brake. In so doing, the signal applied to the signal output of the control unit causes the electronic safety brake to apply its braking effect to the brake rail. The working platform will then no longer be able to fall.

According to a preferred embodiment, the method additionally comprises the step of causing the electronic safety brake to be triggered by actuating an emergency switch that the control unit has.

The emergency switch can activate the electronic safety brake by means of the processing unit. The emergency switch is preferably designed as a latching switch. This is advantageous since the fitter can operate the switch at any time, in particular if necessary. This activates the electronic safety brake. This means that the safety brake securely holds the traveling body on the rail system or is brought at least into a state in which a movement relative to the rail system can lock the safety brake, and the traveling body is therefore held on the rail system.

The advantage of the emergency switch is that the emergency switch allows the fitter to actively switch the electronic safety brakes. As a result, the traveling body can be placed on the rail system, which yields greater stability of the working platform than is the case when the working platform is only suspended on the traction means. However, the emergency switch can also be actuated if the working platform assumes an unsafe operating state in which the traction means remains so taut that the slack-cable contact does not trigger.

According to a preferred embodiment, the method additionally comprises the step of causing the electronic safety brake to be tensioned by the control signal so that the electronic safety brake can be triggered, wherein the triggering is triggered in particular by switching off a flow of current.

Electronic safety brakes can have actuators which cause or at least enable the electronic safety brake to be tensioned. The control signal therefore does not only trigger the electronic safety brake but is also able to cause the safety brake to be tensioned by corresponding signals.

Advantageously, an interruption of the control signal, i.e. an unintentional switching-off of the current flow, produces a safe state. The brake is activated in this state.

According to a preferred embodiment, the method additionally comprises the step of transporting the control unit by means of a handle by which the control unit can be carried.

According to a preferred embodiment, the method additionally comprises the step of winding a cable of the control unit onto a winding aid, wherein the cable is designed in particular as a power cable for supplying power to the control unit, a safety sensor cable for connecting to the safety sensor, or a signal cable which can be connected to the electronic safety brake.

The handle and the winding aid serve to make it easy to transport the control unit. An advantage of the control unit is that it is easily transportable. The control unit is used several times in different elevator systems during the installation. In this case, a fitter carries the control unit by a transport vehicle to the elevator system to be installed and back after installation.

A handle is preferably ergonomically shaped so that the weight of the control unit can be carried by the fitter.

The winding aid preferably comprises one, typically several hooks around which the cables can be wound. In this case, a separate winding aid can be provided for each of the cables, or only one winding aid around which all cables of the control unit are wound.

According to a preferred embodiment, the method additionally comprises the step of temporarily attaching the control unit to a traveling body of an elevator system by means of a quick fastening system, wherein the quick fastening system is designed in particular as a hook or clamp.

The control unit or at least a part thereof is fastened to the traveling body. This means that the control unit can be fastened, for example, to a railing of the working platform, to the floor of the working platform, or also to the basic structure of the traveling body.

The control unit can be fastened securely to the working platform. The fastening is accomplished with a quick fastening system. The control unit can be attached to the traveling body by means of a hook. The control unit is held by its weight on the railing. Alternatively, the hook can also be mounted elastically with a receiving opening that is smaller than the thickness of the railing. As a result, the control unit is held better by a clamping force.

Alternatively, a clamping force can also be generated by a clamp. The clamp typically has a thread. By turning the thread, a clamping force can be generated between two clamping surfaces which then secures the control unit to the traveling body.

According to a preferred embodiment, the elevator system comprises a traction means during its installation which serves to move the traveling body, and the slack-cable contact is attached to the connection between the traction means and the traveling body such that a loss of the tensile force on the traction means, in particular a parting of the traction means, can be detected.

The connection between the traction means and the traveling body can take place directly or indirectly via additional components such as, for example, a roller. Typically, the traction means used in the installation phase differs from a support means such as is used for moving the car after completion of the installation.

According to a preferred embodiment, the traction means is movable by a winch, wherein the winch is electrically operated and can be controlled by the traveling body, and/or the winch is temporarily part of the elevator system only before completion of the elevator system.

Preferably, the winch is connected to the traveling body. The slack-cable contact can be mounted between the winch and the traveling body. Such an arrangement has the advantage that the drive is located in the traveling body. As a result, power supply lines and control cables for the winch can be kept short. In addition, the winch can be fastened at the beginning of the installation phase on the traveling body in the pit. The traction means is guided to the shaft ceiling or to another holding structure in the region of the upper shaft end. The traction means can be fastened there or reconnected to the traveling body via a roller, which creates a pulley.

Alternatively, the winch can also be fastened in the region of an upper shaft end. This has the advantage that more space remains on the working platform which is available to the fitter. In this case, the slack-cable contact is preferably mounted between the traction means and the traveling body. The traction means can run from the winch to the traveling body or can run around a roller on the traveling body and be routed back to the winch or to another point at the upper shaft end.

The winch can be designed in particular as a drum winch, drum, or capstan winch.

According to a preferred embodiment, the method for installing an elevator system of the invention additionally comprises the step of mounting a lowermost rail section and inserting the traveling body into the rail section.

In other words, first of all a lowermost rail section is mounted. The rail section typically consists of two rail lengths. A traveling body is then mounted between these two rail lengths. The traveling body preferably comprises the basic structure of an elevator car later used in the completed elevator system. A working platform is preferably constructed on this basic structure.

According to a preferred embodiment, the method additionally comprises the step of attaching a processing unit to the traveling body by means of a quick fastening system.

In other words, a processing unit which is part of the control unit is therefore fastened to the traveling body, in particular to the working platform. For this purpose, a quick fastening system is used which is preferably part of the control unit. The quick fastening system can alternatively also be preassembled on the working platform.

Suitable quick fastening systems are preferably clamps or hooks.

According to a preferred embodiment, the method additionally comprises the step of establishing an electrical connection to the electronic safety brake of the traveling body.

For this purpose, the control unit can have plugs which are adapted to the electronic safety brake to be controlled. In addition, the control unit can have the required protocols for controlling the electronic safety brakes.

According to a preferred embodiment, the method additionally comprises the step of lifting the traveling body along the rail section by means of a winch.

In so doing, the winch can wind or unwind the traction means. This causes the traveling body to be able to move along the already mounted rail sections. As a result, the fitter can in particular reach a location in the shaft from which he can attach the next rail part.

The location of the individual functions can be configured differently. In particular, the processing unit can also be integrated into the safety sensor. In particular, the processing unit and the safety sensor can also be integrated into a winch support.

DESCRIPTION OF THE DRAWINGS

Further advantages, features and details of the invention can be found in the following description of embodiments and with reference to the drawings, in which like or functionally like elements are provided with identical reference signs. The drawings are merely schematic and are not to scale.

They show.

DETAILED DESCRIPTION

Figure 1:
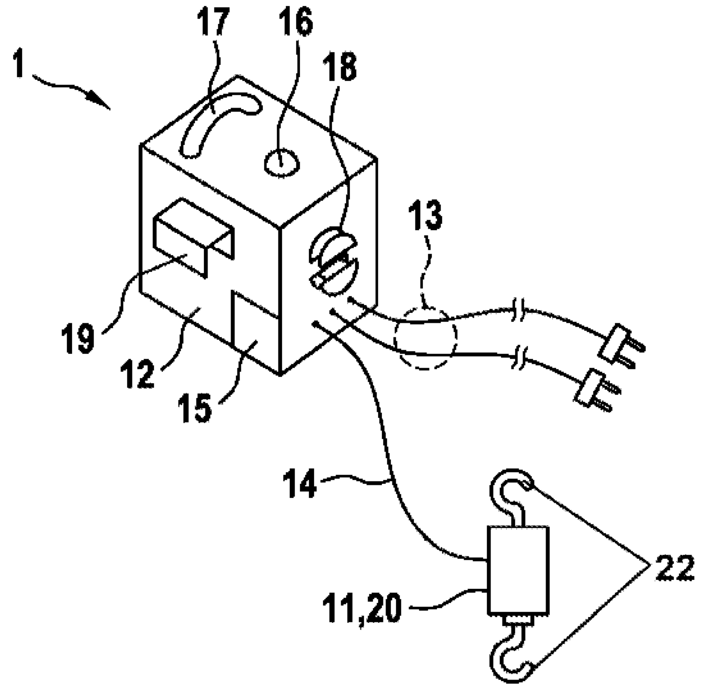
FIG. 1 is a perspective view of a control unit according to the invention.

FIG. 1 shows a control unit 1. The control unit 1 is designed such that it can be easily transported and quickly installed. It has a handle 17 which allows the fitter to easily transport the control unit 1. While transporting and while storing between the uses of the control unit 1, the cables of the two signal outputs 13 and the safety sensor cable 14 which runs to the safety sensor 11 can be wound onto a winding aid 18. The winding aid 18 comprises two semicircular elements which are suitable for winding on the cables.

The safety sensor 11 is designed as a slack-cable contact 20. It comprises two hooks 22. One of the two hooks 22 is suspended on the traveling body, the second of the two hooks 22 is connected to the traction means or the winch.

In order to be able to fasten the control unit 1, it has a quick fastening system 19. This can be suspended on a railing of a traveling body. The quick fastening system is designed to be slightly elastic so that, in a suspended state, it clamps the railing of the traveling body and is thereby held.

The energy can be supplied by an external power supply with, for example, 240 VAC (not shown). Alternatively or additionally, the control unit 1 has a mobile energy source 15. This can be designed as a battery or rechargeable battery and can be integrated into the processing unit. The control unit 1 is designed such that a failure of the power supply results in a safe state of the safety brakes and therefore the elevator system. The electronic safety brake is designed in such a way that the electronic safety brake is prevented from being triggered by a voltage and/or a current from the control unit. If this voltage or this current is interrupted, the electronic safety brake will be triggered. The control unit is therefore designed in such a way that, in the event of a failure of the power supply, it also drops the signal at the signal output.

The emergency switch 16 is attached directly to the processing unit 12. This is an alternative embodiment to the embodiment shown in FIG. 3. The emergency switch 16 serves to allow the fitter to activate the electronic safety brakes on the traveling body. This could be the case, for example, if the fitter wishes to deposit the traveling body on the safety brakes in order to use the winch for another task than holding the traveling body.

Figure 2:
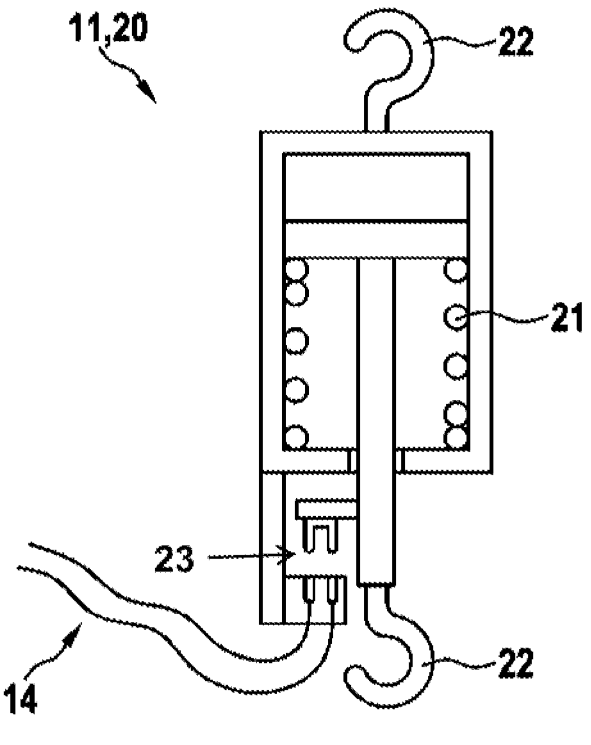
FIG. 2 is a schematic view of a slack-cable contact.

FIG. 2 shows a slack-cable contact 20 as an embodiment of a safety sensor 11. The two hooks 22 are pulled apart by a tensile force. The spring 21 is compressed in this case. The safety switch 23 closes a circuit in this case. This circuit runs via the safety sensor cables 14 to the processing unit.

As soon as the tensile force falls below a critical level, the spring 21 expands, and the safety switch 23 opens the circuit.

Figure 3:
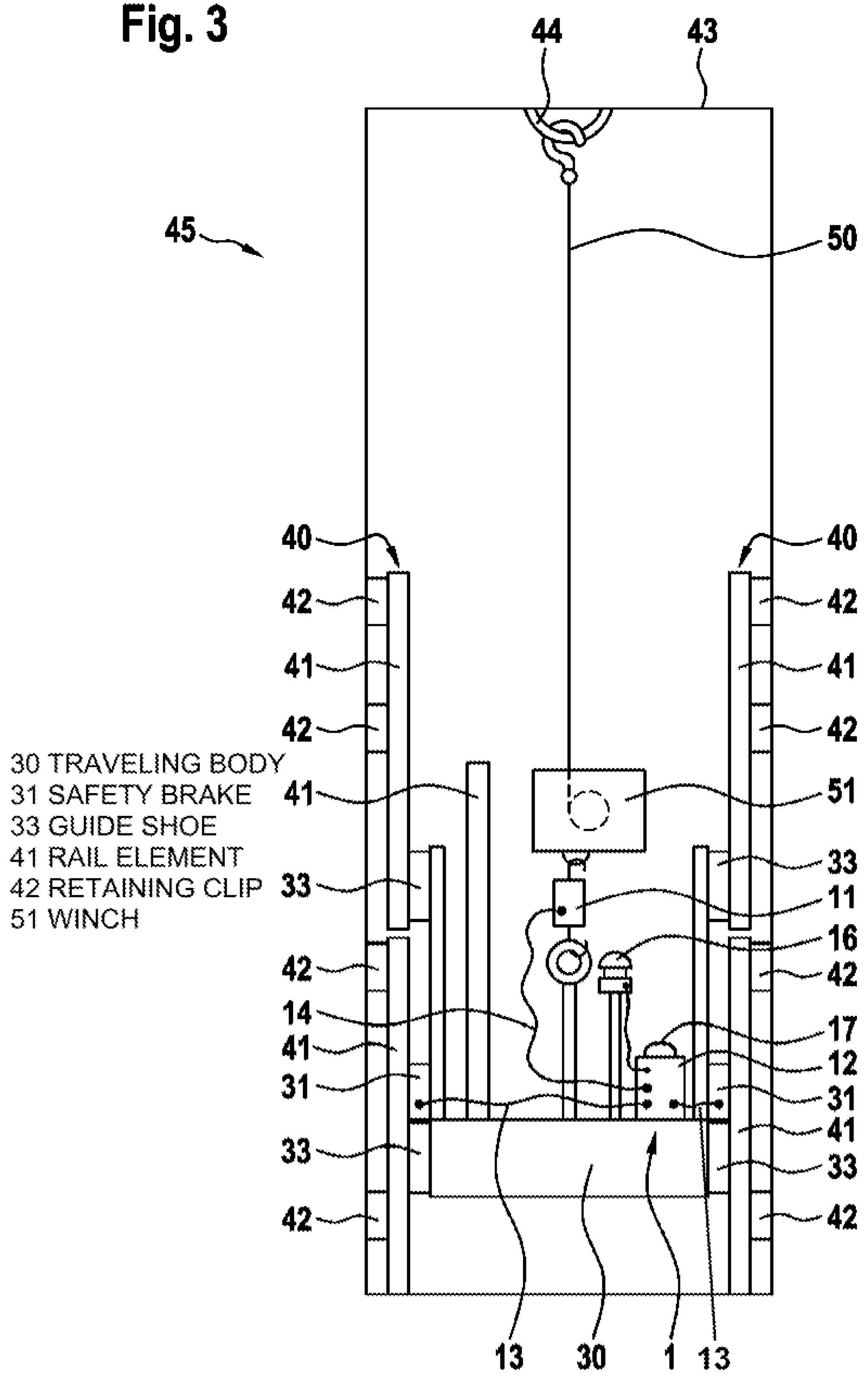
FIG. 3 is a schematic view of an elevator system in its installation phase with a control unit.

FIG. 3 shows an elevator system 45. Installation has been started in an elevator shaft 43. Four rail elements 41 of the rail system 40 are already attached by means of retaining clips 42. The traveling body 30 has a basic structure, with four guide shoes 33 and two electronic safety brakes 31. This ensures that the traveling body 30 can be displaced along the already created rails and can also be reliably braked. The traveling body 30 is displaced by means of a winch 51. The traction means 50 of the winch is fastened to a holding point 44 in an upper region of the elevator shaft 43. The winch 51 is connected to the traveling body by means of the safety sensor 11. The safety sensor cable 14 connects the safety sensor 11 to the processing unit 12. The processing unit 12 controls the two electronic safety brakes 31 via the two signal outputs 13.

The traveling body is used to transport additional rail elements 41 and the fitter in the elevator shaft 43 in order to firstly attach the additional retaining clips 42 there, and then to successively extend the rail system 40. The electronic safety brakes 31 can be activated at any time by means of the emergency switch 16. This can, for example, cause travel to immediately stop and thereby prevent a potentially dangerous situation. However, it can also merely be done to place the traveling body 30 on the electronic safety brakes 31 and thereby enable more comfortable working. It is then also possible to use the winch 51 for lifting rail elements 41, for example.

The control unit 1 remains temporarily in the elevator system 45. It is therefore advantageous that the control unit 1 is easy to transport thanks to the handle 17.

Figure 4:
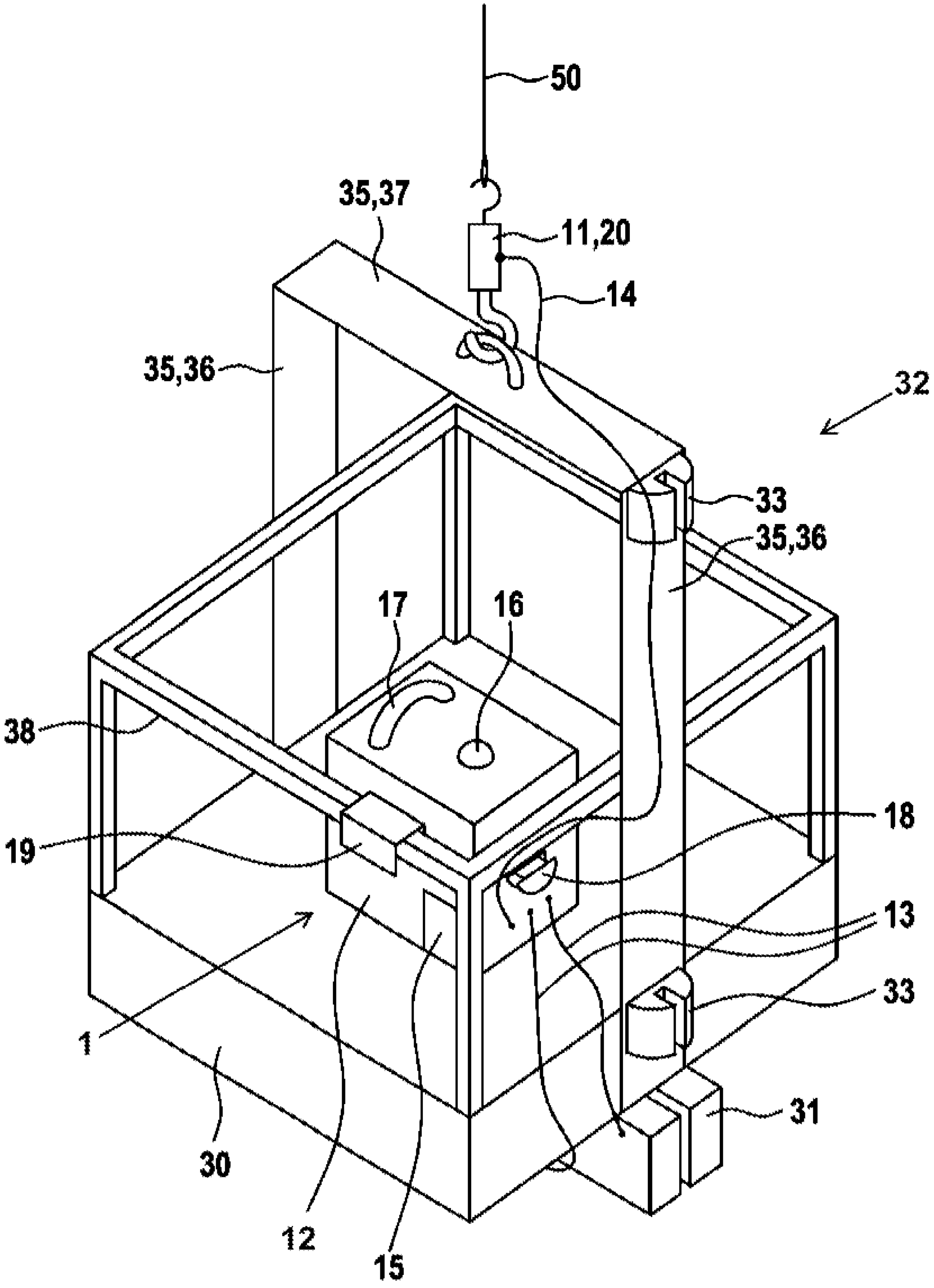
FIG. 4 is a perspective view of a working platform having a control unit.

FIG. 4 shows a view of the working platform 32 which has a control unit 1 as shown in FIG. 1. With the quick fastening system 19, the processing unit 12 of the control unit 1 is attached to a railing 38. The railing 38 is part of the traveling body 30 only during the installation phase. The handle 17, the emergency switch 16, the mobile energy source 15 and the winding aid 18 are analogous to the embodiment in FIG. 1. In contrast to FIG. 3, in which the electronic safety brakes 31 are mounted between the two guide shoes 33, the electronic safety brakes 31 are mounted under the two guide shoes 33 in FIG. 4. The two guide shoes 33 are fastened to the shield 36 of the catch frame 35. The safety sensor 11 is attached to the upper yoke 37, which is also part of the catch frame. The safety sensor 11 is connected to the processing unit 12 via the safety sensor cable 14. The safety sensor 11 is designed as a slack-cable contact 20. The electronic safety brakes 31 are electrically connected to the processing unit 12 via the signal outputs 13. In this case, a signal output 13 runs under the traveling body 30 to the electronic safety brake 31 on the other side of the traveling body 30.

After completion of the installation work, the control unit 1 and the railing 38 are removed and replaced by final car walls. The final car floor is then applied to the floor surface, and side walls are installed. The basic construction of the base with the electronic safety brakes 31 together with the catch frame 35 and with the guide shoes 33 are here used further. They therefore do not need to be dismantled and removed.

Finally, it should be noted that terms such as "comprising," "having," etc. do not preclude other elements or steps and terms such as "a" or "an" do not preclude a plurality. Furthermore, it should be noted that features or steps which have been described with reference to one of the above exemplary embodiments may also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for installing an elevator system, the method comprising steps of:

- using an at least partially installed traveling body as a movable working platform in the elevator system during an installation of the elevator system, wherein the traveling body is supported by a traction means, and the traveling body has an electronic safety brake;
- creating an operating state of the electronic safety brake by using a control unit adapted to control the electronic safety brake, the control unit including a safety sensor, a processing unit and a signal output;
- connecting the signal output to the electronic safety brake;
- generating a control signal by the processing unit at the signal output, wherein the control signal controls activation of the electronic safety brake;
- detecting an unsafe operating state of the working platform by the safety sensor;
- controlling the signal output due to the detection of an unsafe operating state by the processing unit such that the electronic safety brake is activated by the control signal; and
- removing the control unit when the installation of the elevator system is complete.

2. The method according to claim 1 wherein safety sensor is a slack-cable contact that activates the electronic safety brake when a lower limit value for a tensile force on the traction means is undershot.

3. The method according to claim 1 including a step of supplying the control unit exclusively via a mobile energy source.

4. The method according to claim 3 wherein the mobile energy source is a battery.

5. The method according to claim 1 including a step of activating the electronic safety brake by actuating an emergency switch of the control unit.

6. The method according to claim 1 including a step of tensioning the electronic safety brake by the control signal applying a flow of current to the electronic safety brake, and activating the electronic safety brake by switching off the flow of current.

7. The method according to claim 1 including a step of transporting the control unit to and from the elevator system by a handle adapted for carrying the control unit.

8. The method according to claim 1 including a step of winding a cable of the control unit onto a winding aid of the control unit, wherein the cable is one of a power cable adapted to supply power to the control unit, a safety sensor cable connecting the safety sensor to the control unit, and a signal cable adapted to connect the control unit to the electronic safety brake.

9. The method according to claim 1 including a step of temporarily attaching the control unit to the traveling body with a quick fastening system.

10. The method according to claim 9 wherein the quick fastening system is a hook or clamp.

11. The method according to claim 1 comprising additional steps of:

- mounting a lowermost rail section; and
- movably mounting the traveling body onto the lowermost rail section.

12. The method according to claim 11 including a step of lifting the traveling body along the lowermost rail section by a winch.

13. The method according to claim 11 including a step of attaching the control unit to the traveling body by a quick fastening system.

14. The method according to claim 1 wherein the step of connecting the signal output includes establishing an electrical connection to the electronic safety brake with a signal output cable.

15. A control unit adapted to perform the method according to claim 1, the control unit comprising:

- the processing unit;
- the safety sensor connected to the processing unit; and
- the signal output connected to the electronic safety brake of the traveling body.

* * * * *